United States Patent [19]

Parsons

[11] Patent Number: 5,287,089
[45] Date of Patent: Feb. 15, 1994

[54] HAND MANIPULATABLE COMPUTER INPUT DEVICE

[75] Inventor: John A. Parsons, Cumberland, Md.

[73] Assignee: Micro-Integration Corporation, Cumberland, Md.

[21] Appl. No.: 882,008

[22] Filed: May 13, 1992

[51] Int. Cl.$^5$ .................. G06F 3/033; H01C 10/10
[52] U.S. Cl. ..................................... 345/156; 338/47; 73/862.68; 345/157
[58] Field of Search ............... 340/709, 706; 200/6 A, 200/5 R; 73/862.05, 862.68; 338/47

[56] References Cited

U.S. PATENT DOCUMENTS

| | | | |
|---|---|---|---|
| 4,479,392 | 10/1984 | Froeb et al. | 73/862.05 |
| 4,488,017 | 12/1984 | Lee | 200/6 A |
| 4,493,219 | 1/1985 | Sharp et al. | 73/862.05 |
| 4,736,191 | 4/1988 | Matzke et al. | 340/709 |
| 4,896,003 | 1/1990 | Hsieh | 200/6 A |
| 4,983,786 | 1/1991 | Stevens et al. | 340/709 |
| 5,012,230 | 4/1991 | Yasuda | 340/706 |

Primary Examiner—Alvin E. Oberley
Assistant Examiner—Kara Farnandez
Attorney, Agent, or Firm—Wegner, Cantor, Mueller & Player

[57] ABSTRACT

The computer input device includes an elastic actuator button of generally hemispheric shape. An applied force causing an indentation in a curved portion of the button is transmitted via the material of the button to cause a corresponding elastic bulging of a bottom, normally flat portion of the button and of a conductive film and resistive film which are attached thereto. During such bulging, a portion of the resistive film is urged into contact simultaneously with two or three oppositely disposed conductive traces. This action can cause a cursor to be moved in a direction corresponding to the direction of force of the push when the device is attached to the proper circuitry. The amount of pressure applied to and transmitted through the elastic material of the button determines the size of the area of contact between the resistive film and the pattern of conductive traces and, ultimately, the speed and/or distance of movement of the cursor in that direction. A central post may protrude from the bottom of the button into a corresponding depression or hole in the base of the device so as to act as a contact or actuator for a separate switch so as to provide a function separately from or in concert with the other functions provided by the control.

9 Claims, 2 Drawing Sheets

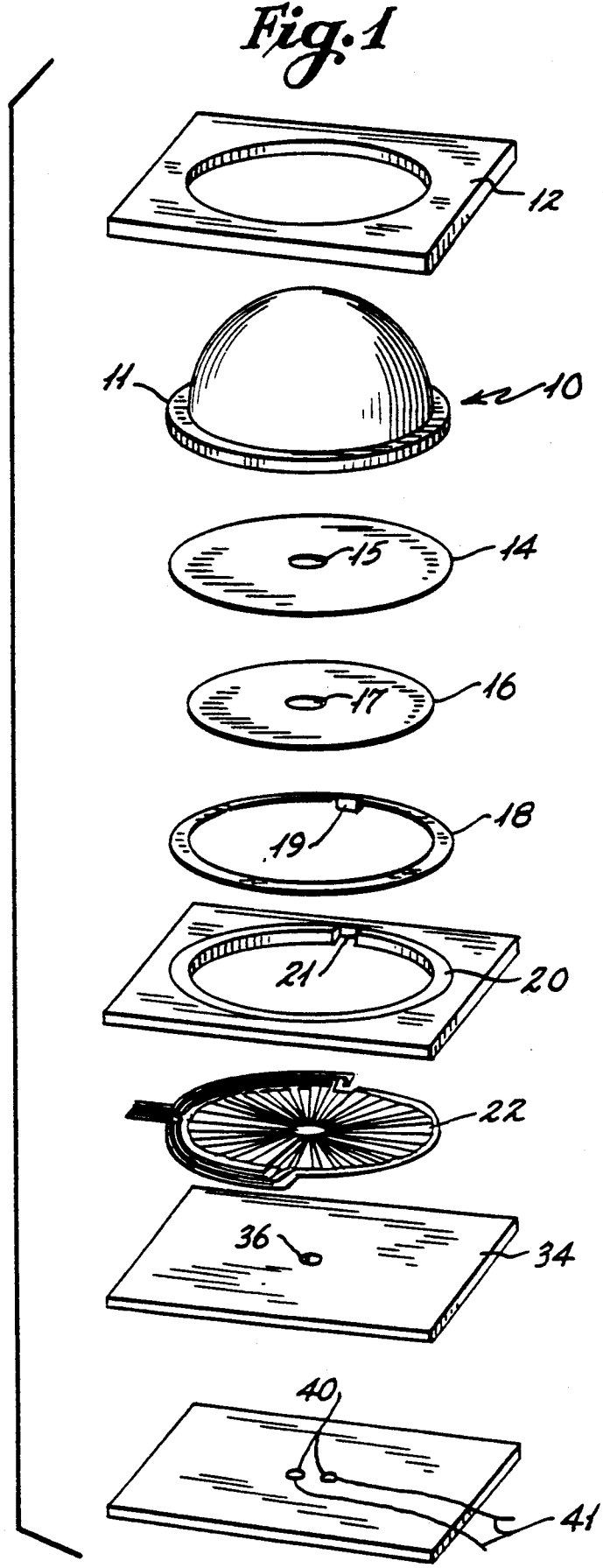

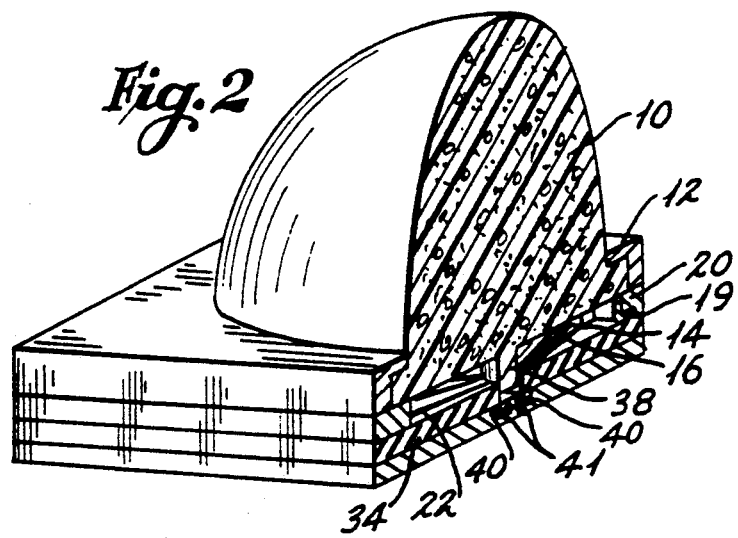
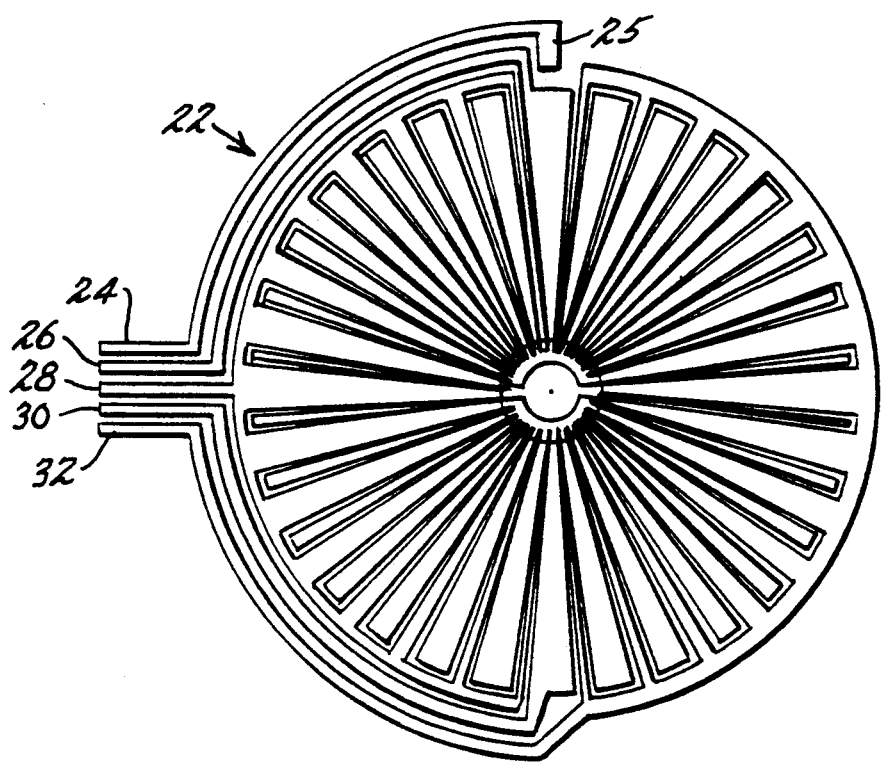
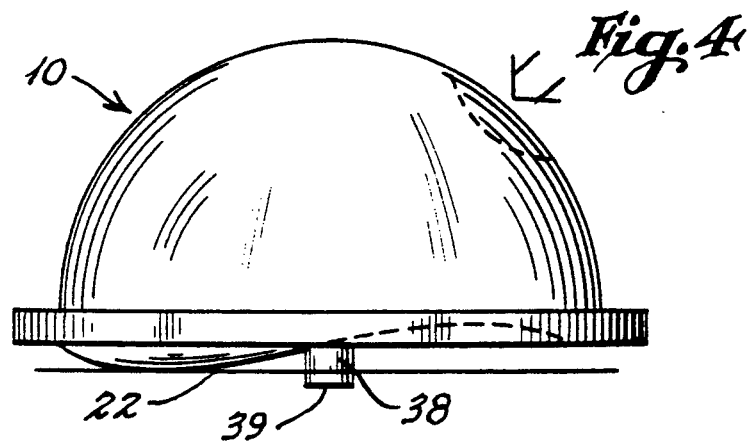

HAND MANIPULATABLE COMPUTER INPUT DEVICE

PRIOR ART CROSS REFERENCES

The following references are exemplary of the prior art and the disclosures thereof are incorporated by reference into the instant application.

U.S. Pat. No. 4,479,392 to FROEB et al., entitled FORCE TRANSDUCER, issued Oct. 30, 1984.

U.S. Pat. No. 4,488,017 to LEE, entitled CONTROL UNIT FOR VIDEO GAMES AND THE LIKE, issued Dec. 11, 1984.

U.S. Pat. No. 4,493,219 to SHARP et al., entitled FORCE TRANSDUCER, issued Jan. 15, 1985.

U.S. Pat. No. 4,896,003 to HSIEH, entitled MULTI-POSITION ELECTRICAL SWITCH, issued Jan. 23, 1990.

U.S. Pat. No. 5,012,230 to YASUDA, entitled INPUT DEVICE FOR DIGITAL PROCESSOR BASED APPARATUS, issued Aug. 30, 1991.

BACKGROUND OF THE INVENTION

Generally, the invention is in the field of hand manipulatable input devices for computers or the like. More particularly, it is intended as a replacement for a computer mouse, joystick or trackball and, with the proper supporting electronics, will perform the functions of any of these three input devices.

It is known to provide a computer input device utilizing a force transducer by which the input is varied according to the force applied to an elastomeric actuator which, in turn, varies an area of interaction between two electrically propertied surfaces according to that force. U.S. Pat. No. 4,493,219 discloses such an application using a joystick and a plurality of such force transducers disposed on the outer ends arms which radiate outward from the axis of the joystick. Upon tilting of the joystick in a particular direction, the force applied corresponds to the degree of tilting of the joystick and the direction of the force corresponds to actuation of the transducer or transducers situated on the arm or arms pointing in that direction from the axis of the joystick.

It is an object of the instant invention to provide an energy conversion and transmission device as an input for a computer display or the like and utilizing a single elastically deformable actuator button through which the direction and magnitude of a force applied at one surface portion of the button is transmitted to a corresponding other surface portion of the button.

Additionally, it is an object of the invention to provide a particular printed pattern of interdigitated conductors, a selected portion of which are actuatable according to the direction and magnitude of the force applied to the single actuator button.

These and other objects of the invention will become apparent from the following disclosure, particularly when considered with respect to the prior art cross-referenced above.

SUMMARY OF THE INVENTION

The computer input device includes an elastic actuator button of generally hemispheric shape with a curved portion, a peripheral flange, and a flat portion covered by a conductive film disc which, in turn, is substantially covered by a resistive film, except for an annular portion at the periphery of the conductive disc. An electrical insulator borders the periphery of the resistive film so as to provide a circular void and to act as a spacer between the resistive film and another conductive film having an appropriate pattern and being spaced from the resistive film. The conductive pattern has four separate fan-shaped and interdigitated "direction" traces, and a separate "button" trace which is electrically connected to the conductive disc of the button. This stacked structure is sandwiched between an insulative base and a frame like retainer which engages the top of the button flange. In use, a push on a portion of the button is transmitted through the material of the actuator button and causes a corresponding elastic deformation of the material of another portion of the button and of the conductive disc film and resistive film which are attached thereto. During such deformation, a portion of the resistive film is urged into contact with two or three of the direction traces simultaneously. This action can cause a cursor to be moved in a direction corresponding to the direction of force of the push when the device is attached to the proper circuitry. The amount of pressure applied to and transmitted through the elastic material of the button determines the size of the area of contact between the resistive film and the fingers of the conductive pattern and, ultimately, the speed and/or distance of movement of the cursor in that direction. A central post may protrude from the bottom of the button into a corresponding depression or hole in the base of the device so as to act as a contact or actuator for a separate switch so as to provide a function separately from or in concert with the other functions provided by the control.

BRIEF DESCRIPTION OF THE DRAWINGS

FIG. 1 is an exploded isometric view of the invention.

FIG. 2 is a partial, cross-sectional view of the device of FIG. 1 when not exploded.

FIG. 3 is a top plan view of a conductive film pattern which is operable with the invention.

FIG. 4 is an elevational view of the button of the device, with phantom line illustration of deformation of the elastic material by an applied force and the resultant deformation of the bottom of the button.

DETAILED DESCRIPTION OF THE INVENTION

Perhaps the component parts of the inventive device are best seen in the exploded view of FIG. 1, in which the flexible actuator 10 consists of an elastically deformable material which is generally shaped like a hemisphere having a peripheral flange 11 and a centrally disposed post 38 (seen in FIGS. 2 and 4) protruding from the flat surface of the hemisphere. A disc-shaped conductive film 14 covers the flat portion of the actuator, except for the depending post portion 38. In turn, except for an annular peripheral portion, the conductive film disc 14 is covered by a resistive film 16. As seen in FIG. 1, the films 14 and 16, respectively, have orifices 15 and 17 through which post 38 protrudes.

An insulating base 34 is also provided with a central orifice at 36, and receives a conductive film pattern 22 on the top surface thereof. An insulator 20 has an orifice therethrough which is generally the same diameter as resistive film 16 and conductive film pattern 22 and is of a thickness sufficient to provide spacing between resistive film 16 and conductive film 22. A conductive ring 18, situated on top of the insulating spacer 20, surrounds resistive film 16 and is in contact with conductive film disc 14. The conductive ring 18 has a feed-through tab 19 which fits within a notch 21 of insulating spacer 20 and engages the contact point 25 of a so-called "button" trace 24 (best seen in FIG. 3). A retainer 12 is engagable with peripheral flange 11 of actuator button 10 so as to complete a sandwiched structure as best seen in FIG. 2.

As seen in FIG. 3, the conductive film pattern 22 has four separate fan-shaped and interdigitated "direction" traces in addition to the separate "button" trace. The "up" trace 26 is situated diametrically opposite from the "down" trace 30, with the fingers thereof equally interdigitated with the "left" trace 28 and the "right" trace 32. Likewise, the "left" trace 28 is diametrically opposite from the "right" trace 32 and is equally interdigitated with the "up" trace 26 and the "down" trace 30. The outputs of these various traces of the pattern are connectable to external circuitry which is generally well known and, per se, is not part of the instant invention.

Although central post 38 is not essential to practice one aspect of the invention, it serves several useful functions. For instance, one of the functions of the central post 38 is to act as a stabilizer for the elastomeric button 10. Additionally, the post 38 may act as an insulated or conductive switch actuator portion. As seen in FIGS. 1 and 2, the button 38 may extend through the orifice 36 of insulating base 34 and have a conductive surface on the bottom portion thereof which is engagable with spaced electrical contacts 40 so as to complete a circuit through conductors 41. Alternatively, it is not necessary that central post 38 have any conductive portion. Rather, it could be used simply to actuate a separate electrical switch upon sufficient displacement of the post 38 downwardly through orifice 36.

Referring to FIG. 4, when a portion of the curved surface of the elastomeric actuator 10 has a force applied thereto in the direction of the arrow of FIG. 4, a corresponding portion of the lower surface of the button, including the films 14 and 16, are flexed so that the resistive film 16 contacts the conductive pattern 22 at a location and in an amount commensurate with the applied force. As seen in FIG. 4, the central post 38 serves to anchor or at least restrict movement of the center of the button and, thus, helps to ensure that the surfaces on opposite sides thereof move opposite to each other, as illustrated in phantom. When sufficient pressure is applied, a portion of the resistive film 16 on the bottom of the button 10 contacts a portion of the conductive film pattern 22 on the base 34 to provide a resistive current path from the conductive film 14, through area of contact between the resistive film portion 16 and some of the conductive fingers of the film pattern 22, the external circuitry, the button trace 24 and conductive ring 18 back to the conductive film 14.

In operation, a user applies pressure to the actuator button in a generally sideways direction, a straight down direction, or a combination of the two directions.

When pressure is applied along the arrow i FIG. 4, the curved surface of the button 10 is deformed (as indicated in phantom) and the direction and magnitude of the applied force is transmitted through the elastically deformable material to the underside of the button which is coated with the conductive and resistive films 14 and 16. The corresponding deformation of this bottom surface of the button causes the resistive film 16 to contact conductive film pattern 22 at a location on the pattern and in an amount commensurate with the direction and magnitude of the applied force, so as to establish a corresponding resistive connection thereto. As more pressure is applied, a greater area of contact is realized between resistive film 16 and conductive film pattern 22, lowering the resistance of the connection. The amount of resistance provides a means to determine the amount of pressure being applied to the button, within the limits that are established by the composition of the resistive film, the flexibility of the button, and the contact surface size.

The pattern of conductive film 22 (FIG. 3) allows the direction of the applied pressure to be determined according to contact therewith by the resistive film 16. If, for example, the applied pressure is light and exactly towards the "up" quadrant of the pattern, then the resistive film 16 will contact the conductive film pattern 22 on only the "up" fan of the pattern. If the pressure is increased, more of the fans of the pattern will be contacted, but the "left" and "right" trace fans are opposite of each other and will be subtracted by external circuitry. The net result is an output from the "up" trace having a magnitude proportional to the amount of pressure applied to the button and a direction proportional to the area of contact with the "up" trace, and cancelling of the outputs from the "left" and "right" traces. The same thing applies to all four quadrants of the pattern. This output magnitude is translatable into size or speed or distance of movement, or combinations thereof, for a cursor or the like. Typically, the cursor halts upon removal of the applied pressure.

If pressure is applied in a direction that is not exactly towards one of the four quadrants of the conductive film pattern 22, and sufficient pressure is applied, contact between the resistive film 16 and the conductive film pattern 22 is made on two fans simultaneously.

External circuitry ignores very small outputs, to prevent false single-direction outputs. These would occur if very light pressure were applied in a direction not exactly on a quadrant, so that only one fan arm was contacted.

The arms of the fans are of different cross-sectional areas based on their direction. The furthest rightside "up" fan arm closest to the "right" trace fan is small compared to the arm of the "right" trace. If contact is made between these two arms, the "up" output would be small compared to the "right" output, thus producing a measure of the direction of the pressure applied. As more pressure is applied, both outputs increase proportionally, again giving a measure of applied pressure. This proportionalism applies to all directions of the film pattern 22 and provides a means to determine the amount and direction of applied pressure anywhere in any quadrant thereof.

If pressure is applied axially downwards only, as opposed to towards any side quadrant, the switch contacts 40 will be completed by the conductive portion on the bottom of central post 38 so as to provide a separate switch which is usable to provide a function other than a measure of the magnitude and direction of the applied force. Alternatively, it is within the purview of the concept of the invention to incorporate use of this switch together with the other functions of the input device as described above.

Thus, the objects set forth above, among those made apparent from the preceding description, are efficiently attained and, since certain changes may be made in the construction set forth without departing from the scope of the invention, it is intended that all matter contained in the above description or shown in the accompanying drawings shall be interpreted as illustrative and not in a limiting sense. For instance, it is considered to be within the scope of the invention to eliminate the resistive film 16, and to provide that the fingers of the pattern are a resistive film.

The following claims are intended to cover all of the generic and specific features of the invention herein described and all statements of the scope of the invention which, as a matter of language, might be said to fall therebetween.

Now that the invention has been described, we claim:

1. In an energy conversion and transmission device having a first electrically propertied substrate which is substantially flexible and a second electrically propertied substrate, said first substrate being disposed in proximate relationship with, and moveable relative to, said second substrate in order to vary an electrical property in response to a force applied to said first substrate, and a nonconductive spacer disposed intermediate said first and second substrates and having an aperture with which said first and second substrates are in register and through which said first and second substrates may electrically communicate according to variations of said electrical property, and an actuator by which said force is applied to said first substrate, the improvement comprising:

said actuator comprising a button of elastically deformable material in engagement with said first substrate so as to elastically deform over a portion of said button in response to said applied force and to transfer a magnitude and direction of said force through said material so as to cause a corresponding deformation, commensurate with said magnitude and direction of said applied force, of another portion of said button and of a portion of said first substrate which is engaging said other button portion, said force transfer being transmitted to said other portion through and via said elastically deformable material with said direction of said force applied to said portion being selectively variable in order to select various locations of said corresponding deformation of said other portion of said button;

said second substrate having an electrically propertied pattern by which said second substrate communicates with said first substrate, commensurate with said magnitude and direction of said applied force, to indicate direction via a location of said portion of said first substrate relative to said pattern and to indicate magnitude via size of an area of correspondence between said portion of said first substrate and said pattern.

2. The improvement of claim 1, and further comprising:

base means for stabilizing said device; and means for stabilizing said button and comprising a post centrally disposed relative to, and extending through, said aperture, said post being connected to one of said button and said base in order to facilitate relative coaxial movement between said base and button while restraining lateral movement therebetween.

3. The improvement as in claim 2, and further comprising:

switch means for controlling a function in addition to functions controlled by said communicating between said first and second substrates, said switch means comprising said post and being actuatable by said force applied to said button.

4. The improvement as in claim 1, and further comprising:

switch means for controlling a function in addition to functions controlled by said communicating between said first and second substrates, said switch means being actuatable by said force applied to said button.

5. The improvement as in claim 1, and further comprising:

said button being generally hemispherically shaped to provide a curved surface and a flat surface, said flat surface being substantially covered by said first substrate, and a portion of said flat surface and said first substrate being deformable in magnitude and location in response to a particular magnitude and location of deformation of said curved surface by said applied force.

6. The improvement as claim 1, and further comprising:

said pattern comprising plural separate conductive traces attachable to circuitry external of said device, said traces having fingers protruding into interstices between other fingers of said traces;

said first substrate comprising a resistive film presenting one side toward said pattern and covered on another side by a conductive film, said conductive film being attachable to said external circuitry; and said first and second substrates contacting according to said applied force to provide a resistive path between said traces and said conductive film through said resistive film with an amount of contacting and of resistance presented therebetween being commensurate with said magnitude of applied force and a location on said pattern at which said contacting occurs being commensurate with said direction of force applied.

7. The improvement as claim 1, and further comprising:

said pattern comprising plural separate resistive traces attachable to circuitry external of said device, said traces having fingers protruding into interstices between other fingers of said traces;

said first substrate comprising a conductive film conductively attachable to said external circuitry; and said first and second substrates contacting according to said applied force to provide a resistive path through said traces commensurate with an amount of contact between said first and second substrates which, in turn, is commensurate with said magnitude of applied force, and with a location of said pattern at which said contacting occurs being commensurate with said direction of force applied.

8. A hand manipulatable input device for a cursor of a computer display screen, and comprising:

a single actuator button comprising a material which is elastically deformable such that a depression in one portion of said button by an applied force is transmitted as a corresponding projection from another portion of said button in an amount and direction commensurate with said applied force, said force being transmitted to said other portion through and via said elastically deformable material with said direction of said force applied to said portion being selectively variable in order to select various locations of said corresponding deformation of said other portion of said button;

a base;

a conductive pattern situated on top of said base, traces of said pattern being connectable to circuitry for controlling a display on said screen;

a spacer of nonconductive material with an aperture therethrough, said aperture being positioned in register with said conductive pattern on top of said base;

a resistive film area having a top surface and a bottom surface, said bottom surface being positioned in register with said aperture and said conductive pattern and being spaced from said conductive pattern by said spacer; and a conductive film interposed between sand substantially covering said top surface of said resistive film and said other portion of said button, said conductive film being connectable to said circuitry;

whereby said depression by said applied force results in a resistive electrical contact path between said pattern and said conductive film via said resistive film by an amount commensurate with a magnitude of said force and at a location on said pattern commensurate with a direction of application of said force to said button so as to result in a speed and direction of movement of said cursor according to a corresponding magnitude and direction of said force applied.

9. The device as in claim 8, and further comprising:

said button being generally hemispheric in shape so as to present a curved surface for receiving said depression in a portion thereof, and a generally flat, disc-shaped surface from which said material projects in response to said applied force;

said resistive film being generally disc-shaped; and said conductive pattern being situated on a generally disc-shaped portion of said base.

* * * * *